Jan. 21, 1969  TEIJI UCHIDA  3,423,588
LOW-NOISE OPTICAL MASER OF THE INTERNAL MODULATION TYPE
Filed March 22, 1966
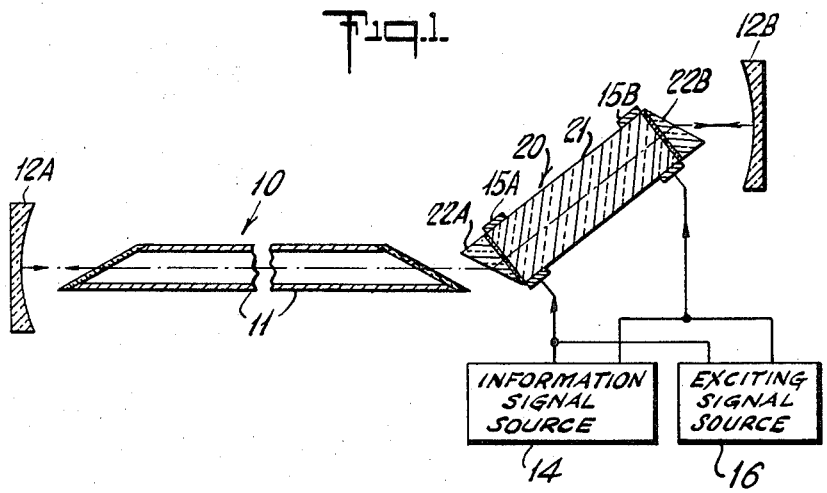
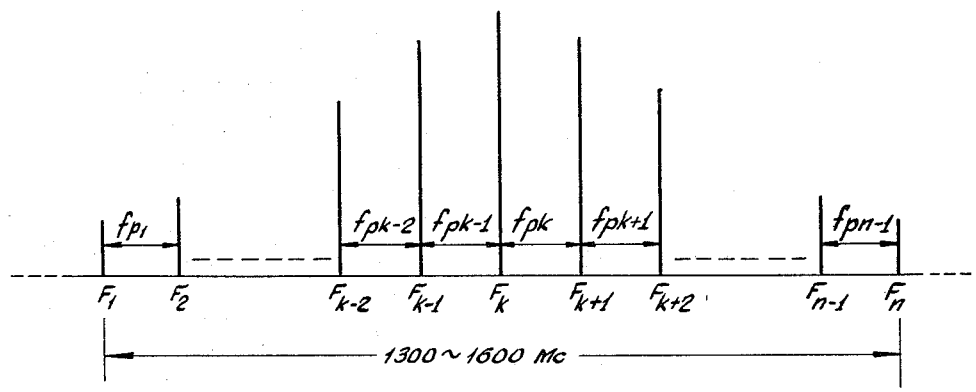
INVENTOR
TEIJI UCHIDA
BY
ATTORNEYS

United States Patent Office 3,423,588
Patented Jan. 21, 1969

3,423,588
LOW-NOISE OPTICAL MASER OF THE INTERNAL MODULATION TYPE
Teiji Uchida, Tokyo, Japan, assignor to Nippon Electric Company, Limited, Tokyo, Japan, a corporation of Japan
Filed Mar. 22, 1966, Ser. No. 536,347
Claims priority, application Japan, Mar. 25, 1965, 40/17,378
U.S. Cl. 250—199    3 Claims
Int. Cl. H04b 9/00

ABSTRACT OF THE DISCLOSURE

In an optical maser device, modulation with an exciting signal is superposed on modulation with the information signal. The frequency of the exciting signal is an integral multiple of $c/2L$, where $c$ is the light velocity and $L$ is the optical path between the mirrors forming the optical resonator. This "locks" the frequency spacing between the adjacent optical output components of various longitudinal modes belonging to a single transverse mode.

---

This invention relates to an optical maser device of the internal modulation type and more particularly to such a device of the kind wherein the spacings of the generated frequencies and the output level are both stabilized.

In my copending patent applications Ser. Nos. 460,712 and 485,684, filed on June 2, 1965 and Sept. 8, 1965, respectively optical maser devices of the internal modulation type have been proposed wherein a specific modulator element was interposed between a pair of reflectors constituting a resonator. However, it has been found that these optical maser devices necessarily have noise because a number of oscillations of both the longitudinal and the transverse modes take place therein, as pointed out in my copending patent application Ser. No. 443,853, filed on Mar. 30, 1965 resulting in insufficiently stable frequency spacings, amplitudes, and intensities of the optical outputs.

In this respect, more detailed information will now be given in conjunction with a helium-neon optical maser, which is the gas optical maser most widely used at the present time. In A. Lengyel's publication entitled "Lasers," published by John Wiley & Sons, Inc., New York (1962) at page 96, FIG. 36, it is shown that the half-value frequency range within which the optical maser action is obtainable is about 1000 mc. It follows, therefore, that in an optical maser device wherein a helium-neon gas discharge tube is interposed, in the manner illustrated in FIG. 32, on page 93 of the Lengyel publication, between a pair of reflectors spaced apart by an optical path of $L$ so as to constitute a resonator, a plurality of longitudinal mode optical-output components belonging to a particular transverse mode, such as the $TEM_{00}$ mode, are spaced, as described on page 97 of said publication, within the above-mentioned frequency range by a frequency spacing $f_p$ given by the formula $$f_p = c/2L$$

where $c$ is the speed of light. For example, $f_p$ is about 150 mc. when the optical path $L$ is one meter. In short, the exemplified helium-neon gas optical maser produces an optical output containing, within a frequency range of 1000 mc. to 2000 mc., sets of frequency components spaced by a given frequency spacing of 150 mc.

More detailed study of the spectrum of the optical output revealed, as reported by W. R. Benett, Jr. on pages 580–593 of "Physical Review," volume 126, No. 2 (1962), that the frequency spacing $f_p$ of the longitudinal modes was not strictly homogeneous but was somewhat heterogeneous because of the weak coupling effects produced between the longitudinal modes of adjacent frequencies by the intrinsic non-linearity of the optical maser action. Let it now be assumed for simplicity that an optical maser is producing an optical output in only one transverse mode containing a plurality of longitudinal modes of the respective frequencies $F_{01}, F_{02}, \ldots$, and $F_{0n}$ as named from the lowest frequency. To speak of two frequencies $F_{02}$ and $F_{03}$ among them, the third-power term of the intrinsic non-linearity produces spurious frequency components of the frequencies $2F_{02}-F_{03}$ and $2F_{03}-F_{02}$. The above-mentioned heterogeneity of the frequency spacing makes these spurious frequencies differ a little from the frequencies $F_{01}$ and $F_{04}$, respectively. On the other hand, the frequency spacing $f_p$ varies with time as revealed in the Benett, Jr. article. This makes the phase relations between the frequency components $2F_{03}-F_{03}$ and $F_{01}$ and between $2F_{03}-F_{02}$ and $F_{04}$ fluctuate with time. These spurious difference-frequency components appear, as a result of square-law detection of the optical output comprising the fluctuating spurious frequency components as the noise, and introduce as a further result, fluctuation of the level of the optical output of the optical maser device as a whole.

In order to suppress production of such noise, forced stabilization of the frequency spacing was proposed. In one of the devices for stabilizing the optical output as a whole that was proposed by L. E. Hargrove et al. on pages 4–5 of "Applied Physics Letters," volume 5, No. 1 (July 1964), a quartz vibrator is disposed transversely of the optical axis of the resonator and is excited by an electric oscillation of several times as small a frequency as the frequency spacing $f_p$ so as to "lock" the frequency spacing of the generated frequency components and also to make it possible to select those components which have the desired well-defined frequency spacing. However, it is necessary with this device that the mechanical-resonance frequency of the quartz piece disposed transversely of the light path should be equal to a critical resonant frequency determined with respect to the frequency spacing. Moreover, a separate modulator is necessary in addition to the quartz vibrator to effect the desired internal modulation for a wide-band information signal.

Accordingly, it is an object of the present invention to provide an optical maser device of the internal-modulation type having the characteristics of substantially reduced noise and being little affected due to fluctuation of the optical output level of the device as a whole.

Another object is to provide such an optical maser device having the immediately foregoing characteristics by stabilizing the frequency spacing of the longitudinal-mode optical-output components without any further article or member across the light path within the maser device that would attentuate the resultant optical ouput.

All of the objects, features and advantages of this invention and the manner of attaining them will become more apparent and the invention itself will be best understood by reference to the following description of an embodiment of the invention taken in conjunction with the accompanying drawing, in which:

FIG. 1 is a longitudinal sectional view of an embodiment of this invention; and

FIG. 2 shows the spectrum of the optical output of one device of this invention used in explaining the operation thereof.

Referring now to FIG. 1, an optical maser device of this invention is indicated by the numeral 10 and includes a gas discharge tube 11 which has optical maser action, this tube being provided at both ends with Brewster windows, each of whose normals makes the Brewster's angle with the tube axis. The device 10 further includes a pair of mirrors 12A and 12B consisting an optical resonator and a modulator element 20 disposed across the light path between the discharge tube 11 and the end mirror 12B. The modulator element 20 comprises: an axially elongated rectangular-parallelepiped crystal piece 21 cut out of a KDP or a similar crystal which shows very little absorption of light and has an extremely large electro-optical effect, i.e., the effect such that the electric field produced within the crystal rotates the plane of polarization of the light passing therethrough along the optical axis; a pair of prisms 22A and 22B attached to those end surfaces of the crystal piece 21 which are perpendicular to the optical axis; a pair of electrodes 15A and 15B disposed in close proximity to the respective end surfaces so that they may apply across the crystal piece an information signal supplied from an information-signal source 14 bearing information to be transmitted; and an exciting-signal source 16, connected in parallel with the information-signal source to the electrodes 15A and 15B, for superposing an electric field component produced by the exciting signal on the electric field component originating with the information signal. Most of these constituents are described in some detail in the copending Patent Applications referred to above.

Each of the prisms 22A and 22B is made of glass of nearly the same refractive index as the refractive index $n_0$ (approx. 1.5) of the ordinary rays within the crystal piece 21, with the angle formed between a first and a second side surface thereof being made equal to the complementary angle (about 34°) of the Brewster's angle for the glass. These prisms 22A and 22B are attached by means of a suitable optical adhesive, at their respective first side surfaces to the end surfaces of the crystal piece 21 in such a manner that their edges formed by the first and the second side surfaces are parallel to the X or the Y axis of the crystal piece 21 and their second side surfaces are parallel to each other.

The optical output having the desired modulation may be obtained from the optical maser device described in my copending patent applications above, as the light transmitted from either of the mirrors 12A and 12B, or as the light reflected at either of the Brewster windows, or as the light refracted by a birefringence prism described in my copending patent application Ser. No. 485,684.

FIG. 2 illustrates the spectrum of the optical output of one optical maser device of this invention wherein both the information-signal and the exciting-signal sources 14 and 16 produce no outputs for setting the modulator element 20 into operation and wherein the gas discharge tube 11 is a helium-neon discharge tube oscillating at a single transverse mode $TEM_{00}$. The optical output consists of longitudinal-mode components $F_1$, $F_2 \ldots F_n$, distributed within a frequency range of approx. 1300–1600 mc. Although if there were no mutual coupling between any two of the oscillation modes, these components would have well defined frequencies with a fixed frequency spacing $$f_p = c/2L$$

the spacing $f_p$ is, in practice, not uniform. Thus, a frequency spacing $f_{pk}$ between the components $F_k$ and $F_{k-1}$ ($k$ being an arbitrary integer) assumes a value somewhat different from $c/2L$ and fluctuates with time. Experiments have shown that not only the frequency spacings but also the intensities of the components show fluctuation.

As was already discussed in the Benett, Jr. article, the optical maser device has non-linearity. Therefore, the amplitude modulation, i.e. the intensity modulation, effected by the exciting signal of the frequency around $f_p$ of the exciting-signal source 16 produces at close proximities of the upper and the lower neighboring longitudinal-mode components $F_{k-1}$ and $F_{k+1}$ the side-band components, which lock the frequency spacings $f_p$ between $F_{k-1}$ and $F_k$ and between $F_k$ and $F_{k+1}$, at the frequency of the exciting signal. Inasmuch as these mode-locked components $F_{k-1}$ and $F_{k+1}$ are also amplitude-modulated with the same exciting signal, their respective side-band components eventually lock the frequency spacings between the lower mode-locked component $F_{k-1}$ and its lower adjacent component $F_{k-2}$, and between the upper mode-locked component $F_{k+1}$ and its upper adjacent component $F_{k+2}$. Thus, interlocking results for all the frequency spacings.

Locking of the frequency spacing $f_p$ between the longitudinal-mode optical-output components $F_1$, $F_2 \ldots F_n$, suppresses the fluctuation of the intensity of the optical output of the optical maser device and reduces the noise. It has been found experimentally that in case the exciting-signal frequency is not more than several hundred kilocycles higher or lower than the nominal frequency spacing $f_p$, the mode-locking effect is observed in an optical maser device using a helium-neon gas discharge tube as the tube 11.

In the above explanation pertaining to FIG. 2, it was assumed that an optical maser device was oscillating in a plurality of longitudinal modes belonging to a single transverse mode, such as $TEM_{00}$. In an actual optical maser device which generates the optical output in a number of longitudinal modes belonging to a plurality of transverse modes, the exciting signal locks merely the frequency spacings of the longitudinal-mode optical-output components belonging to the individual transverse modes and consequently there are still a number of closely crowded optical-output components. It is therefore preferable even in an optical maser device according to this invention to effect the mode control, in a manner such as disclosed in my copending patent application Ser. No. 443,853, for allowing oscillation of only one transverse mode.

It is also to be noted that it has been found empirically that the exciting-signal frequency may not necessarily be $c/2L$ but may be, with the resulting locking of the frequency spacings to a certain degree, an integral multiple thereof.

In the embodiment thus far described, the exciting-signal source 16 was connected to the electrodes 15A and 15B in shunt with the information-signal source 14. Although this never causes difficulty because the exciting and the information signals are separated sufficiently in frequency from each other, it is recommended in case these modulating frequencies must be carefully isolated from each other, to provide between the electrodes 15A and 15B an additional parallel electrode and to apply the exciting signal between the additional electrode and the electrode 15A. Also, it should be understood that the crystal piece 21 need not be a KDP crystal but may also be of various other types such as for example, those referred to above in my copending applications.

While the foregoing description sets forth the principles of the invention in connection with specific apparatus, it is to be understood that the description is made only by way of example and not as a limitation of the scope of invention as set forth in the objects thereof and in the accompanying claims.

What is claimed is:

1. A low-noise optical maser device comprising
    an optical maser element including an active substance having optical maser action and being capable of producing optical beams;
    a modulator element including a crystal capable of producing a substantial electro-optical effect and a pair of prisms;
    said crystal further having two end surfaces which are perpendicular to the optical axis thereof;
    each of said prisms having a refractive index substantially equal to the refractive index of the ordinary rays within said crystal and also having a first and a second side surface intersecting each other at the complementary angle of the Brewster's angle;

one of said prisms having its first side surface positioned immediately adjacent to one of the end surfaces of said crystal and the other of said prisms having its first side surface positioned immediately adjacent to the other end surface of said crystal;

said modulator element being arranged in such a manner that said optical beams travel in the direction of said optical axis;

a pair of reflectors;

said optical maser element and said modulator element being interposed between said reflectors in such a manner that said optical beams are reflected therebetween;

first signal-applying means for supplying an information-signal voltage across said crystal in the direction of said optical axis to modulate said optical beam with said information signal;

and second signal-applying means, connected in parallel with said first signal-applying means, for supplying to said crystal an oscillation-mode-locking signal whose frequency is an integral multiple of $c/2L$, wherein $c$ represents the light velocity and $L$ represents the optical path between said reflectors.

2. The invention described in claim 1 wherein said optical maser element comprises a helium-neon discharge tube having Brewster windows at the ends thereof.

3. The invention described in claim 1 wherein said crystal is in the shape of an axially elongated rectangular parallelopiped and possesses a substantial electro-optical characteristic.

4. The invention described in claim 1 wherein said prisms are secured to said crystal by a suitable optical adhesive.

References Cited

UNITED STATES PATENTS

| 3,159,707 | 12/1964 | Bennett et al. | 250—199 |
|---|---|---|---|
| 3,170,122 | 2/1965 | Bennett | 250—199 |
| 3,229,223 | 1/1966 | Miller | 250—199 |
| 3,130,254 | 4/1964 | Sorokin et al. | |

FOREIGN PATENTS 953,721    4/1964    Great Britain.

ROBERT L. GRIFFIN, *Primary Examiner.*

A. MAYER, *Assistant Examiner.*

U.S. Cl. X.R.

332—7.51